United States Patent
Arai et al.

[11] 3,757,133
[45] Sept. 4, 1973

[54] CONTROL FOR AUTOMATIC TRANSMISSION

[75] Inventors: Hiroshi Arai; Takakazu Mori, both of Toyota-shi, Japan

[73] Assignee: Toyota Jidosha Kogyo Kabushiki Kaisha, Toyota-shi, Japan

[22] Filed: Nov. 29, 1971

[21] Appl. No.: 203,092

Related U.S. Application Data

[62] Division of Ser. No. 80,116, Oct. 12, 1970, Pat. No. 3,707,097.

[52] U.S. Cl. ............................. 307/116, 335/206
[51] Int. Cl. ................................. H01h 36/00
[58] Field of Search ................ 307/116, 106, 117, 307/113, 115; 335/206

[56] References Cited
UNITED STATES PATENTS

| | | | |
|---|---|---|---|
| 3,419,731 | 12/1968 | Wheable et al. | 307/115 |
| 3,052,134 | 9/1962 | Worster | 74/866 |
| 2,870,648 | 1/1959 | Gill | 74/866 X |

Primary Examiner—J. V. Truhe
Assistant Examiner—M. Ginsburg
Attorney—Stevens, Davis, Miller & Mosher

[57] ABSTRACT

In an electrical control for an automatic transmission, including a throttle position signal generator and having vehicle speed as well as throttle position as input signals and an optimum selection of gear range as an output, the improvement wherein the throttle position signal generator comprises a magnet operatively connected to a throttle valve, a plurality of magnetically energized switches connected with a circuit including resistors and a source of electric energy for generating a stepped throttle position signal voltage.

9 Claims, 9 Drawing Figures

CONTROL FOR AUTOMATIC TRANSMISSION

This is a division, of application Ser. No. 80,116, filed Oct. 12, 1970, now U.S. Pat. No. 3,707,097, issued Dec. 26, 1972.

BACKGROUND OF THE INVENTION

Field of the Invention

This invention relates to a an apparatus for detecting throttle positions of an engine, and particularly to one used for an electrical control for an automatic transmission of the kind used in automotive vehicles having multiple forward speed ranges, a neutral range, and a reverse range.

DESCRIPTION OF THE PRIOR ART

To control an automatic transmission having multiple forward speed ranges, a neutral range, and a reverse range, at least three basic control signals are necessary. These signals are: an engine operated parameter signal, a vehicle speed signal, and a manual gear range selector signal. Most commonly, the engine operated parameter signal is represented by a throttle position signal, and the vehicle speed signal is represented by a transmission output shaft speed signal. When a manual gear range selector which selects one range out of several ranges including a forward range, a neutral range, and a reverse range is set to the forward range by a driver, forward gear range shifts of an automatic transmission are controlled by the throttle position signal and the vehicle speed signal according to a predetermined shift pattern which is described in terms of throttle position and vehicle speed.

When a hydraulic medium is used exclusively, the control system becomes very complex. Therefore, efforts are continuously being made to replace signal generating and processing means of the control system, which is operated hydraulically, with electrically operated means to make the control system simpler. This electrically operated means is hereinafter called an electrical control circuit.

The prior art electrical control circuit utilizes a potentiometer or a multicontact switch, each linked with an engine throttle valve and also connected with a battery or another kind of electric energy generator and resistors, if necessary, to produce a voltage which corresponds to throttle position and is, therefore, the throttle position signal. This voltage is, in general, called a throttle voltage.

However, the potentiometer and the multicontact switch have two disadvantages: one is that they lack durability due to friction contact between the moving part linked with the engine throttle valve and the stationary part, and the other is that they often produce distorted signals caused by vibrations at contact points, which are transmitted from the vehicle body or the engine.

When the potentiometer is utilized, the throttle voltage changes continuously as the throttle position changes. Usually a relationship between the throttle voltage and the throttle position is linear. However, when the multicontact switch is utilized, the throttle voltage changes discontinuously as the throttle position changes, and is expressed by a stepped line in relation to the throttle position.

In a shift pattern diagram which is described in terms of throttle position and vehicle speed, a shift line is a line which corresponds to shifts between adjacent gear ranges, and an upshift line and a downshift line are lines which correspond to upshifts and to downshifts between adjacent gear ranges respectively. In the same diagram an upshift line and a downshift line corresponding to each other are an upshift line and a downshift line which correspond to upshifts and downshifts between the same adjacent gear ranges. Also in the same diagram shift lines are continuously smooth sloped lines, usually sloped straight lines, in their major portions or in all portions when the potentiometer is used, but the shift lines are stepped lines when the multicontact switch is used. Further in the same diagram, a space or spaces must be provided between the upshift line and the downshift line corresponding thereto to provide hysteresis in the electrical control circuit for the prevention of oscillation between the gear ranges. When the potentiometers is utilized, if the space along the vehicle speed axis between the upshift line and the downshift line corresponding thereto is provided, the space along the throttle position axis between the two is inherently provided, because the shift lines are sloped. This means that no oscillation occurs when shifts occur due a to change of the position of a point representing the condition of vehicle speed and throttle position in the shift pattern diagram along the vehicle speed axis or the throttle position axis or both. However, when the multicontact switch is utilized, even if the space along the vehicle speed axis between the upshift line and the downshift line corresponding thereto is provided, the space along the throttle position axis between the two is not automatically provided, because the shift lines are stepped lines. Therefore, when the multicontact switch is utilized, the electrical control circuit which provides the space along the throttle position axis between the upshift line and the downshift line corresponding thereto as well as the space along the vehicle speed axis between the two becomes more complicated than the electrical control circuit which provides the space only along the vehicle speed axis between the upshift line and the downshift line corresponding thereto. Therefore, when the multicontact switch is utilized, usually only the space along the vehicle speed axis between the upshift line and the downshift line corresponding thereto is provided to avoid the complexity of the structure and mechanism of the electrical control circuit at the sacrifice of the oscillation between gear ranges at the portions of the shift pattern diagram where no space is provided between the upshift lines and the downshift lines corresponding thereto.

Although the electrical control circuit employing a multicontact switch and providing only the space along the vehicle speed axis has the above-mentioned disadvantage, it has a big advantage over the electrical control circuit employing a potentiometer. This advantage is that the structure and mechanism of the former becomes very simple as compared with the latter.

SUMMARY OF THE INVENTION

The control for an automatic transmission of this invention utilizes the same structure and mechanism as the control for an automatic transmission (hereinafter called the simple control) which employs a multicontact switch as a distinct part of the throttle position signal generator incorporated in the electrical control circuit of the control and which provides only the space along the vehicle speed axis between the upshift line and the downshift line corresponding thereto in the predetermined shift pattern diagram without providing the space along the throttle position axis between the upshift line and downshift line corresponding thereto and, further, which is the simplest in the structure and mechanism among the controls for automatic transmissions described below: (1) one which uses a hydraulic medium exclusively; (2) one which uses a potentiometer as a distinct part of the throttle position signal generator incorporated in the electrical control circuit of the control and provides the space between the corresponding upshift and downshift lines along the vehicle speed and throttle position axes; (3) one which uses a multicontact switch as a distinct part of the throttle position signal generator incorporated in the electrical control circuit of the control and provides the space between the corresponding upshift and downshift lines along the vehicle speed and throttle position axes; and (4) the simple control being herein described, except the multicontact switch which is replaced by a new switch device which is a part of this invention to take advantage of simplicity of the simple control and, therefore, to take advantage of increased reliability and reduced production cost as the result of the simplicity.

The switch device of this invention comprises magnetic means operatively associated with a throttle valve of an engine driving the automatic transmission and a plurality of magnetically energized switch means disposed in a spaced relationship to each other and to the magnetic means. The magnetically energized switch means is energized by the magnetic means to close its electric circuit. More specifically, the magnetic means is a magnet mounted on a rotatable disc operatively connected to the throttle valve, and the magnetically energized switch means is a reed switch which is a switch comprising a container usually made of glass, a pair of metal reeds disposed in the container in a confronting manner and having an overlapped portion near the tips thereof with a small gap therebetween. When the reed switch is energized by a magnetic flux formed by the magnet and passing through the reeds, the reeds contact with each other, thereby closing the switch. When the reed switch is de-energized, the read switch opens due to the resilient force of the reeds.

When the simple control is modified by replacing the multicontact switch of the simple control with the switch device of this invention, the modified simple control has a big additional advantage while maintaining the advantage of simplicity of the original simple control. This additional advantage is that the modified simple control has, due to the hysteretic characteristic of the switch device of this invention, the space along the throttle position axis between the corresponding upshift and downshift lines as well as the space along the vehicle speed axis between the corresponding upshift and downshift lines, for prevention of oscillation between gear ranges when shifts occur along the throttle position axis as well as the vehicle speed axis.

Another advantage of the modified simple control of this invention is the prevention of transmission of disturbances caused by vibrations from the vehicle body or the engine into the throttle position signal by utilizing the hysteretic characteristic of the switch device of this invention.

Still another advantage of the modified simple control of this invention is an improvement in the durability of the switch device incorporated in the throttle position signal generator by the elimination of direct contact between the moving part linked with the throttle valve and the stationary part of the switch device.

BRIEF DESCRIPTION OF THE DRAWINGS

FIG. 3b is a view A of FIG. 3a.

DESCRIPTION OF THE PREFERRED EMBODIMENT

It is intended that the control of this invention be applicable to a large variety of automatic transmissions, particularly those in which shifting can be carried out by the operation of brakes and clutches. However, the specific embodiment described herein is designed to apply to a three forward speed transmission. The example of the three forward speed transmission is the one which is described in detail in a copending U.S. patent application Ser. No. 874,934 (filed Nov. 7, 1969; Inventors: Wakamatsu et al.), now U. S. Pat. No. 3,675,511, issued July 11, 1972 and assigned to the same assignee of this invention.

The electrical control circuit of this invention (the electrical control circuit of the modified simple control) is described below in conjunction with the three forward speed transmission disclosed in parent Ser. No. 80,116 (now U.S. Pat. No. 3,707,097) with reference to FIGS. 9 and 10 thereof.

First of all, means for generating the throttle position signal (the throttle voltage) which is called a throttle position signal generator or a throttle voltage generating circuit is described below.

The throttle voltage generating circuit of this invention comprises the switch device of this invention.

In carrying out this invention various types of switch devices, such as a rotary type (a type in which the permanent magnet rotates as a throttle valve rotates), or a sliding type (a type in which the permanent magnet slides as a throttle valve rotates) can be utilized. The specific embodiment described herein is a switch device of a rotary type with four reed switches, designed to apply to a three forward speed transmission.

Examples of reed switches which can be used in this invention are those manufactured by Western Electric Co., U.S.A., having code numbers 224A, 237B and G29, although in this particular embodiment Fujitsu reed switches manufactured by Fujitsu Co., Japan are utilized.

Figure 1:
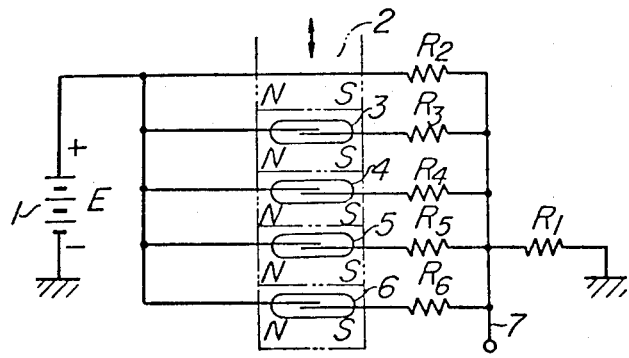
FIG. 1 is a schematic diagram of a throttle voltage generating circuit of this invention.

Referring to FIG. 1 the throttle voltage generating circuit illustrated comprises a battery 1 whose electromotive force is E and whose negative terminal is grounded, a permanent magnet 2, (which is drawn by phantom lines) whose magnetic poles and movement are shown by N and S and a two-head arrow, respectively, which is linked with an engine throttle valve (not shown in the drawing), read switches 3, 4, 5, and 6, resistors $R_2$, $R_3$, $R_4$, $R_5$, and $R_6$, respectively, another resistor $R_1$, an end of which is grounded, and a voltage output terminal 7.

Figure 3A:
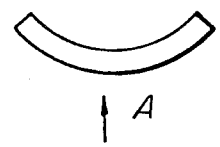
FIG. 3a and 3b taken together show a shape and magnetic poles of a permanent magnet incorporated in the switch device shown in FIG. 2.
Figure 3B:
Figure 2:
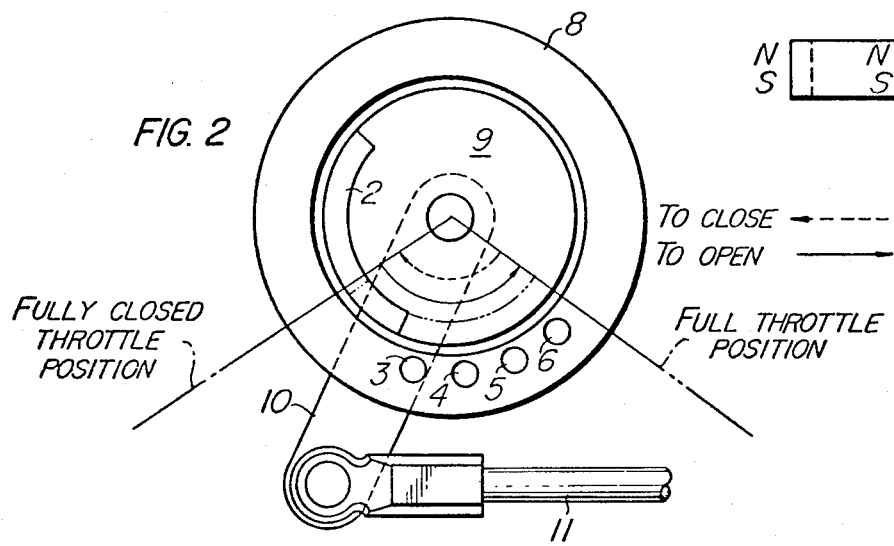
FIG. 2 is a plan view of a switch device of this invention.

The switch device as shown in FIG. 2 comprises a case 8 made of plastic in which the reed switches 3, 4, 5, and 6 are mounted, and a rotor 9 which is located inside the case 8 and connected with an engine throttle valve (not shown in the drawing) by means of an arm 10 and a throttle shaft 11. A permanent magnet 2 whose shape and magnet poles are shown in FIG. 3a and 3b is mounted in one portion of the rotor 9 to enable each one of the reed switches to close its corresponding electric circuit when the switch is energized by the magnetic flux of the magnet 2 as the magnet passes each switch. The switches are de-energized when the magnetic flux is sufficiently reduced by the movement of the magnet away from the switches.

Still referring to FIG. 2 a situation in which a throttle angle, which is an angle indicating throttle position, is consecutively increased from the fully closed throttle position is first considered below.

The reed switch 3 is located in a position where its electric circuit is closed when a throttle angle measured from the fully closed throttle position becomes a predetermined angle $\theta_1$. Likewise, the reed switches 4, 5, and 6 are located in positions where their electric circuits are closed when the throttle angle becomes predetermined angles $\theta_2$, $\theta_3$, and $\theta_4$, respectively.

When the throttle angle is increased from zero (the fully closed throttle position) by depressing an accelerator pedal but does not reach $\theta_1$, all reed switches are off and, therefore, the throttle voltage measured at the voltage output terminal 7 is $$E_{N1} = R_1/R_1 + R_2 \cdot E$$

where $E_{N1}$ = throttle voltage when the throttle angle is increased from zero but is less than $\theta_1$.

When the accelerator pedal is further depressed to obtain a throttle angle between $\theta_1$ and $\theta_2$, the reed switch 3 is on and consequently the throttle voltage is $$E_{N2} = \frac{R_1}{R_1 + \dfrac{1}{\dfrac{1}{R_2} + \dfrac{1}{R_3}}} \cdot E$$

where $E_{N2}$ = throttle voltage when the throttle angle is increased from an angle smaller than $\theta_1$ to an angle between $\theta_1$ and $\theta_2$.

Likewise, when the accelerator pedal is further depressed to obtain throttle angles between $\theta_2$ and $\theta_3$, between $\theta_3$ and $\theta_4$, and between $\theta_4$ and $\theta_5$ (the angle of the full throttle position), the reed switches 3 and 4 are on, 3, 4, and 5 are on, and 3, 4, 5, and 6 are on, respectively. Consequently, the throttle voltages become respectively $$E_{N3} = \frac{R_1}{R_1 + \dfrac{1}{\dfrac{1}{R_2} + \dfrac{1}{R_3} + \dfrac{1}{R_4}}} \cdot E$$

where $E_{N3}$ = throttle voltage when the throttle angle is increased from an angle smaller than $\theta_2$ to an angle between $\theta_2$ and $\theta_3$, $$E_{N4} = \frac{R_1}{R_1 + \dfrac{1}{\dfrac{1}{R_2} + \dfrac{1}{R_3} + \dfrac{1}{R_4} + \dfrac{1}{R_5}}} \cdot E$$

where $E_{N4}$ = throttle voltage when the throttle angle is increased from an angle smaller than $\theta_3$ to an angle between $\theta_3$ and $\theta_4$, and $$E_{N5} = \frac{R_1}{R_1 + \dfrac{1}{\dfrac{1}{R_2} + \dfrac{1}{R_3} + \dfrac{1}{R_4} + \dfrac{1}{R_5} + \dfrac{1}{R_6}}} \cdot E$$

where $E_{N5}$ = throttle voltage when the throttle angle is increased from an angle smaller than $\theta_4$ to an angle between $\theta_4$ and $\theta_5$.

A situation in which the throttle angle is consecutively decreased is next considered.

Even if the throttle angle is decreased to $\theta_4$ from $\theta_5$ (the full throttle position) by releasing the accelerator pedal, reed switch 6 does not become deenergized due to hysteresis of the reed switch. Only when the throttle angle becomes a certain fixed angle smaller than $\theta_4$, that reed switch 6 will be de-energized. That fixed angle is hereinafter designated as $\theta_4'$. In other words, when the throttle angle is greater than $\theta_4'$ while it is being decreased from $\theta_5$, the throttle voltage is always $E_{N5}$. The range between $\theta_4$ and $\theta_4'$ is a hysteresis range.

This hysteresis range is determined by the characteristics of the reed switch, the location of the reed switch in relation to the permanent magnet, and the magnetmotive force of the permanent magnet.

Figure 4:
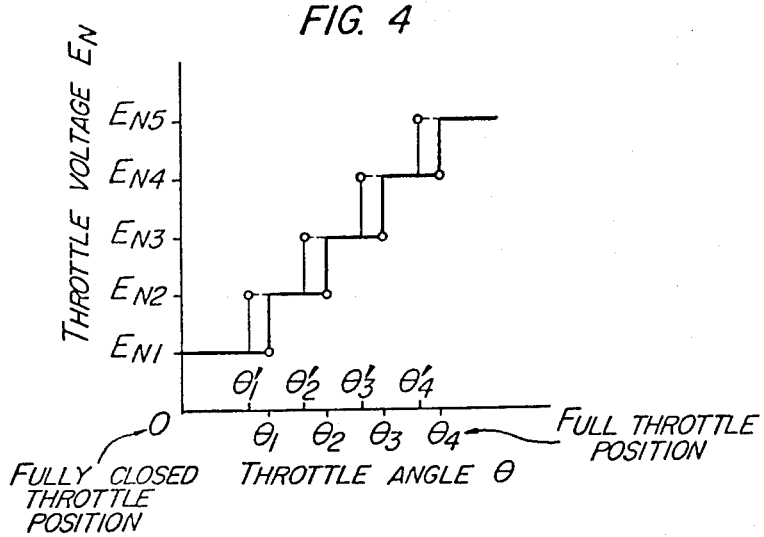
FIG. 4 is a diagram showing a relationship between throttle voltage $E_N$ and throttle angle $\theta$ obtained from the throttle voltage generating circuit shown in FIG. 1, a component of which is the switch device shown in FIG. 2.

Likewise, fixed throttle angles where the reed switches 5, 4, and 3 become de-energized while the throttle angle is being decreased from $\theta_4'$ continuously by releasing the accelerator pedal are designated as $\theta_3'$, $\theta_2'$, and $\theta_1'$, respectively. Again in other words, in the range between $\theta_4'$ and $\theta_3'$, between $\theta_3'$ and $\theta_2'$, between $\theta_2'$ and $\theta_1$, and between $\theta_1'$ and zero (the fully closed throttle position) the throttle voltages are $E_{N4}$, $E_{N3}$, $E_{N2}$, and $E_{N1}$, respectively. The foregoing relationship between the throttle angle $\theta$ and the throttle voltage $E_N$ is shown in FIG. 4.

In contrast to the above, the throttle voltage generating circuit which replaced the reed switches with a multicontact switch produces the throttle voltages $E_{N5}$, $E_{N4}$, $E_{N3}$, $E_{N2}$, and $E_{N1}$, in the ranges between $\theta_5$ and $\theta_4$, between $\theta_4$ and $\theta_3$, between $\theta_3$ and $\theta_2$, between $\theta_2$ and $\theta_1$, and between $\theta_1$ and zero, respectively, when the throttle angle is consecutively decreased.

Although in this embodiment four reed switches are used, it is clear that more reed switches can be used to get a finer throttle angle- throttle voltage relationship.

It is also clear that in view of the lack of direct contact between the moving part (the rotor) linked with the throttle valve and the stationary part (the case) the durability of the switch device of this invention is highly improved as compared with that of potentiometers or multicontact switches which have friction contact elements such as sliding contacts or multicontact points, and that the throttle voltage produced by the throttle voltage generating circuit comprising the switch device of this invention is not distorted by disturbances which are caused by vibrations transmitted from the vehicle body or the engine while the throttle voltage produced by the throttle voltage generators comprising potentiometers or multicontact switches is distorted by the above-mentioned disturbances, since the hysteretic characteristic of the reed switches eliminates the disturbances.

Figure 5:
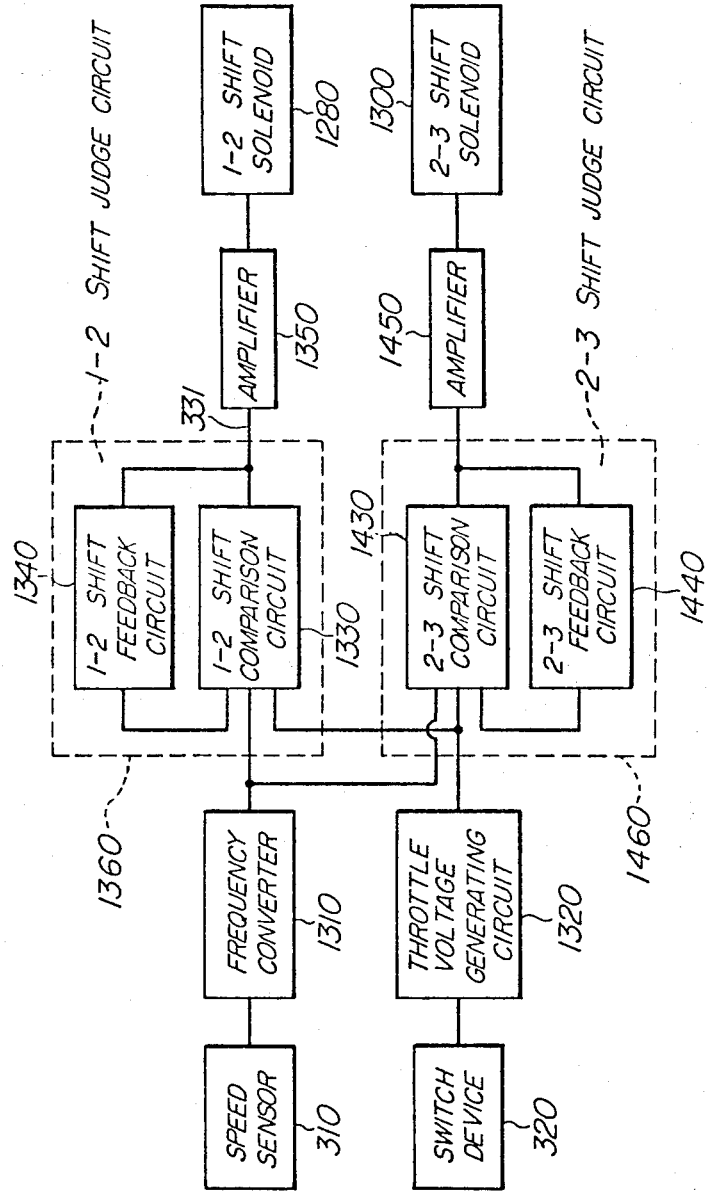
FIG. 5 is a block diagram of an electrical control circuit for a three forward speed automatic transmission.

Referring to FIG. 5 the switch device 320 of this invention is, as previously described, a component of the throttle voltage generating circuit 1320 which produces the throttle voltage as shown in FIG. 4.

The vehicle speed signal is usually represented by the transmission output shaft speed as previously mentioned.

Figure 6:
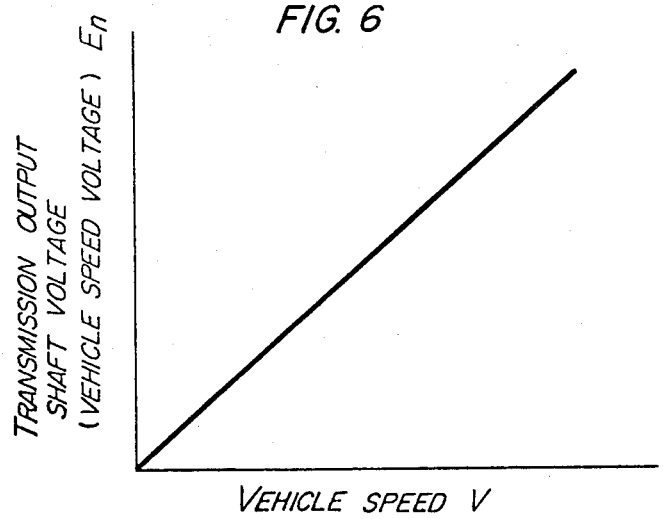
FIG. 6 is a diagram of a vehicle speed signal voltage $E_n$ which is produced by a speed sensor connected with a frequency converter shown in FIG. 5 and is proportional to transmission output shaft speed, consequently to vehicle speed.

A speed sensor 310 which detects the speed of the transmission output shaft is preferably a pulse generator comprising a toothed member driven by the transmission output shaft and an adjacent inductor pickup which generates a pulse every time a tooth of the member passes the pickup so that the frequency generated in the pickup is proportional to the transmission output shaft speed. This frequency signal is fed to a frequency converter 1310 which produces an output voltage proportional to the transmission output shaft speed. An example of the thus obtained relationship between the vehicle speed V and the transmission output shaft voltage (vehicle speed voltage $E_n$) is shown in FIG. 6. The frequency converter 1310 comprises an amplifier, an amplitude limiter, and a frequency detecting, rectifying, and amplifying circuit. The frequency signal is first supplied to the amplifier in which the amplitude of the frequency signal is increased. The amplitude limiter limits the amplitude of the signal to a fixed value, and converts the shape of the waveform of the frequency signal into a rectangular waveform, because the rectangular waveform similar to the original signal waveform is maintained even after the frequency signal is amplified. The frequency detecting, rectifying, and amplifying circuit converts the output of the amplitude limiter into a D.C. voltage. The amplifier, the amplitude limiter, and the frequency detecting, rectifying, and amplifying circuit are all of the conventional type.

A 1-2 shift judge circuit 1360 consists of a 1-2 shift comparison circuit 1330 and a 1-2 shift feedback circuit 1340. Similarly, a 2-3 shift judge circuit 1460 consists of a 2-3 shift comparison circuit 1430 and a 2-3 shift feedback circuit 1440. Here 1-2 shifts and 2-3 shifts mean shifts between the first gear range and the second gear range, and shifts between the second gear range and the third gear range, respectively. A 1-2 upshift means a shift from the first gear range to the second gear range, and a 1-2 downshift means a shift from the second gear range to the first gear range. Similarly, a 2-3 upshift and a 2-3 downshift mean a shift from the second gear range to the third gear range, and a shift from the third gear range to the second gear range, respectively.

The throttle voltage $E_N$ and the vehicle speed voltage $E_n$ are supplied from the throttle voltage generating circuit 1320 and the frequency converter 1310, respectively, to the judge circuits 1360 and 1460.

The 1-2 shift judge circuit 1360 has a structure as shown in FIG. 11 of U.S. Pat. No. 3,707,097 and the description therein of circuit 1360 is incorporated herein by reference.

If the throttle voltage generating circuit including the switch device of this invention is used to generate the throttle voltage, the throttle voltage oscillation never occurs due to the hysteretic characteristic of the reed switches even if the throttle angle hovers around each of the predetermined throttle angles corresponding to the positions of the reed switches. Therefore, the shift oscillation occurs in no region when the throttle voltage generating circuit including the switch device of this invention is used instead of the throttle voltage generating circuit including the multicontact switch in the electrical control circuit to generate the throttle voltage, because one of the two requisite conditions for causing the shift oscillation, that is, the occurrence of the throttle voltage oscillation, is never met by the throttle voltage generating circuit including the switch device of this invention.

This matter is explained in another way by using a shift pattern diagram in terms of the vehicle speed and the throttle angle below.

Figure 7:
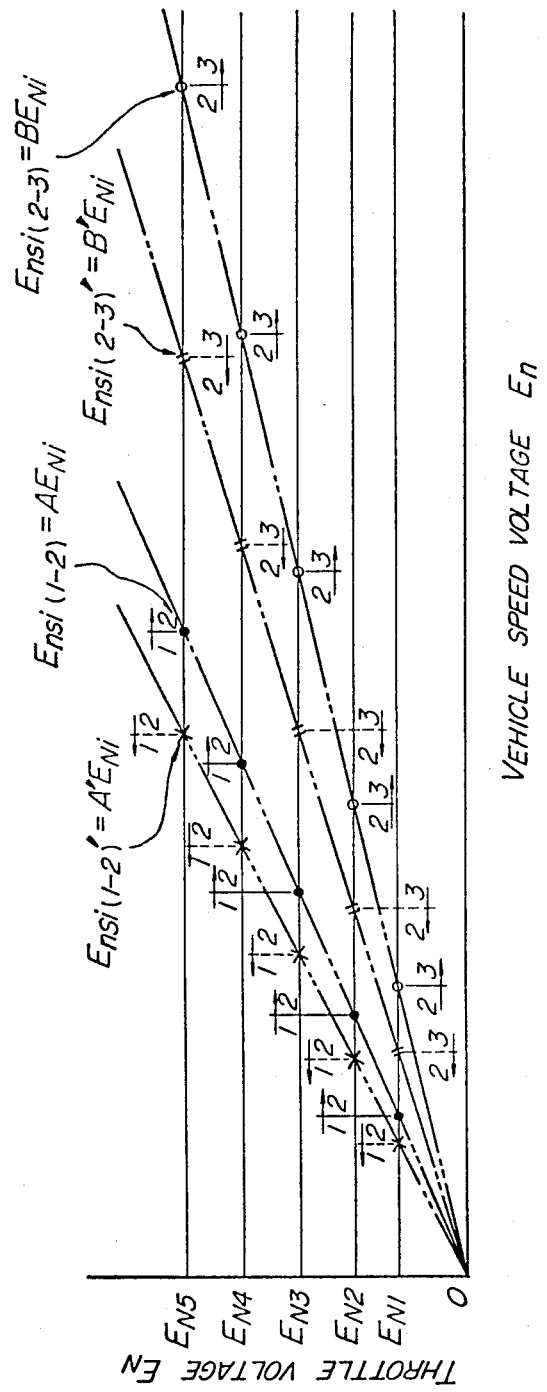
FIG. 7 is a transmission shift pattern diagram in terms of throttle voltage versus vehicle speed voltage.
Figure 8:
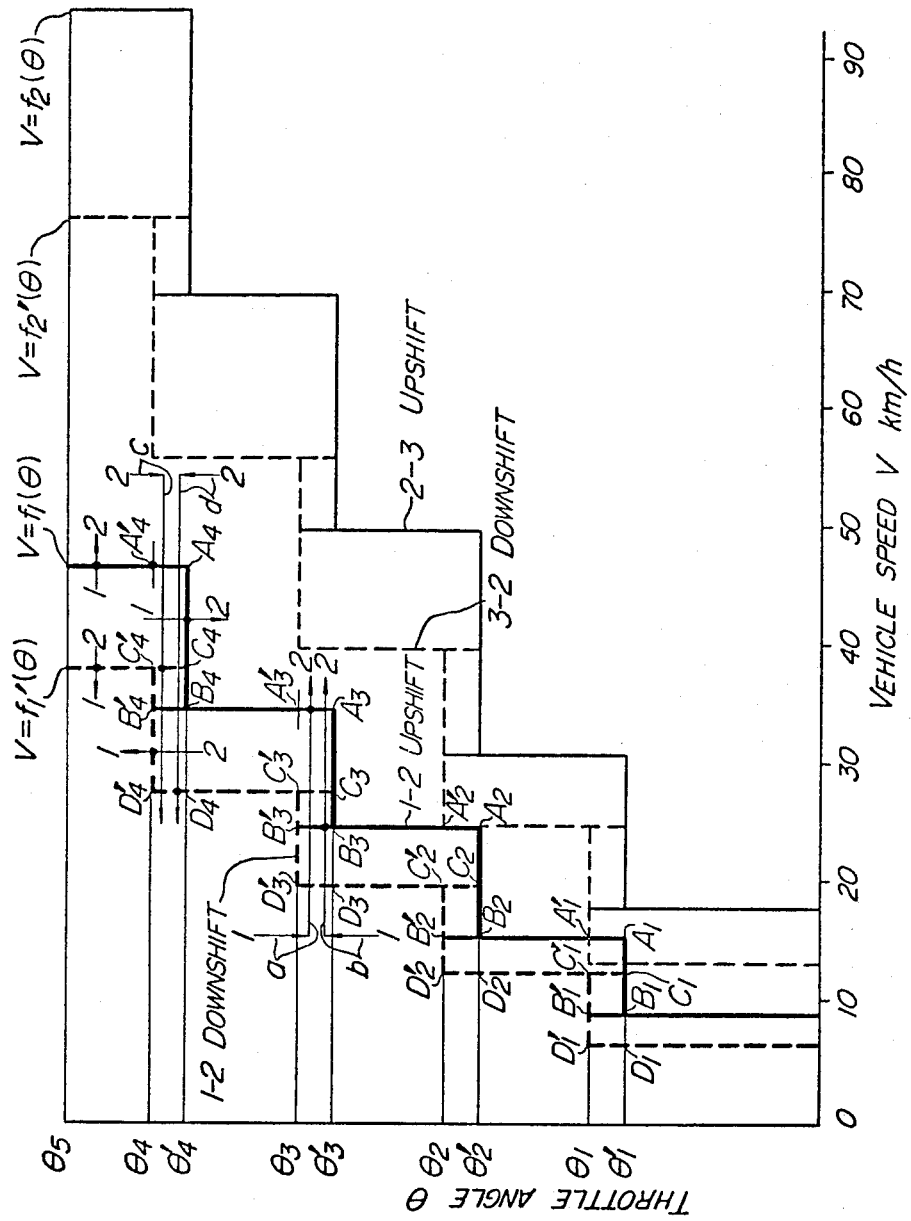
FIG. 8 is a diagram of the same shift pattern as shown in FIG. 7, drawn in terms of throttle angle $\theta$ versus vehicle speed V.

If the vehicle speed V and the throttle angle $\theta$ are substituted for the vehicle speed voltage $E_n$ and the throttle voltage $E_N$ respectively, the shift pattern in terms of the vehicle speed voltage $E_n$ and the throttle voltage $E_N$ as shown in FIG. 7 is converted into a shift pattern in terms of the vehicle speed V and the throttle angle $\theta$ as shown in FIG. 8. As shown in FIG. 8, due to the hysteretic characteristic of the reed switches the spaces along the throttle angle axis between the upshift lines and the downshift lines appear between $\theta_1'$ and $\theta_1$, between $\theta_2'$ and $\theta_2$, between $\theta_3'$ and $\theta_3$, and between $\theta_4'$ and $\theta_4$. When the vehicle speed is maintained at nearly the same speed, an upshift occurs when the throttle angle is decreasing. Therefore, the upshift lines which are perpendicular to the throttle angle axis are located at $\theta_1'$, $\theta_2'$, $\theta_3'$, and $\theta_4'$. Similarly, the downshift lines perpendicular to the throttle angle axis are located at $\theta_1$, $\theta_2$, $\theta_3$, and $\theta_4$, because the downshift occurs only when the throttle angle is increasing if the vehicle speed is maintained at nearly the same speed. In other words, hysteresis of the reed switches lowers the upshift lines perpendicular to the throttle angle axis by the size of hysteresis of the reed switches. If hysteresis of the switch device does not exist, as is the case with the multicontact switch, the spaces along the throttle angle axis between the upshift lines and the downshift lines do not exist, and the upshift lines and downshift lines perpendicular to the throttle angle axis are located at the same corresponding throttle angles: $\theta_1$, $\theta_2$, $\theta_3$, and $\theta_4$. The spaces along the throttle angle axis between the upshift lines and the downshift lines mean hysteresis between the upshift and the downshift when the vehicle speed is maintained at nearly the same speed thereby preventing oscillation between gear ranges. Therefore, these spaces are hysteresis ranges.

As shown in FIG. 8, the hysteresis ranges, which represent two gear ranges according to the history of the gear ranges, intervene continuously and entirely between the adjacent gear range regions each of which represents only one gear range and is not affected by the history of the gear ranges. This means no shift oscillation occurs between adjacent gear ranges under any circumstances.

To provide the hysteresis ranges between the upshift lines and the downshift lines which are perpendicular to the throttle angle axis in the shift pattern diagram in terms of throttle angle and vehicle speed when the shift pattern consists of stepped shift lines can be done without using the switch device of this invention by providing one group of throttle voltages for the upshifts and another group of throttle voltages for the downshifts in an electrical control circuit for a transmission in contradistinction to the electrical control circuit of this invention which uses the same group of throttle voltages for the upshifts and the downshift. However, it is clear that an electrical control circuit for a transmission which uses two different groups of throttle voltages each provided for the upshifts and for the downshifts must have far more complicated electronic circuits than the electrical control circuit of this invention. Therefore, one advantage of the electrical control circuit including the switch device of this invention (the electrical control circuit of this invention) is that the electrical control circuit of this invention, notwithstanding the simplicity of structure thereof, always performs stable shifts however the throttle angle and the vehicle speed may change.

Another characteristic of the electrical control circuit of this invention is, in the shift pattern diagram in terms of vehicle speed and throttle angle, the separation of each line parallel to the throttle angle axis of the 1-2 and 2-3 upshift lines and the 1-2 and 2-3 downshift lines into two different kinds of branches in the regions between $\theta_1'$ and $\theta_1$, between $\theta_2'$ and $\theta_2$, between $\theta_3'$ and $\theta_3$, and between $\theta_4'$ and $\theta_4$.

This is described in detail below.

Referring to FIG. 8, the 1-2 upshift line which is designated as $V = f_1(\theta)$ in the drawing consists of $A_1-A_1'$, and $B_1-B_1'$ between $\theta_1'$ and $\theta_1$, $A_2-A_2'$ and $B_2-B_2'$ between $\theta_2'$ and $\theta_2$, $A_3-A_3'$ and $B_3-B_3'$ between $\theta_3'$ and $\theta_3$, and $A_4-A_4'$ and $B_4-B_4'$ between $\theta_4'$ and $\theta_4$. These separations occur due to the existence of two different conditions of each applicable reed switch: one condition in which that particular reed switch is on, and another in which that particular reed switch is off.

Taking the case of the region between $\theta_3'$ and $\theta_3$, the two branches of the upshift lines are described below.

When the throttle angle stays between $\theta_3'$ and $\theta_3$ after decreasing from an angle bigger than $\theta_3$ (therefore, the reed switch 5 is on, and, of course, all reed switches whose corresponding throttle angles for positioning thereof are smaller than the corresponding throttle angle of the reed switch 5 are also on) and the vehicle speed is increasing via the routes as shown by two arrows designated as a in FIG. 8, the upshift occurs at the shift line of $A_3-A_3'$.

When the throttle angle stays between $\theta_3'$ and $\theta_3$ after increasing from an angle smaller than $\theta_3'$ (therefore, the reed switch 5 is off, but the reed switches 4 and 3 are on) and the vehicle speed is increasing via the routes as shown by two arrows designated as b in FIG. 8, the upshift occurs at the shift line $B_3-B_3'$.

Similarly, taking the case of the region between $\theta_4'$ and $\theta_4$, the two branches of the downshift line are described below.

When the throttle angle stays between $\theta_4'$ and $\theta_4$ after decreasing from an angle bigger than $\theta_4$ (therefore, the read switch 6 and other reed switches whose corresponding throttle angles for positioning thereof are smaller than the corresponding throttle angle of the reed switch 6 are on) and the vehicle speed is decreasing via the routes as shown by two arrows designated as c in FIG. 8, the downshift occurs at the shift line of $C_4-C_4'$.

When the throttle angle stays between $\theta_4'$ and $\theta_4$ after increasing from an angle smaller than $\theta_4'$ (therefore, the reed switch 6 is off, but other reed switches whose corresponding throttle angles for positioning thereof are smaller than the corresponding throttle angle of the reed switch 6 are on) and the vehicle speed is decreasing via the routes as shown by two arrows designated as d in FIG. 8, the downshift occurs at the shift line of $D_4-D_4'$.

If hysteresis of the switch device does not exist, as is the case with the multicontact switch, all the 1-2 upshifts and 1-2 downshifts in the region between $\theta_1'$ and $\theta_1$, between $\theta_2'$ and $\theta_2$, between $\theta_3'$ and $\theta_3$, and between $\theta_4'$ and $\theta_4$ occur at the lines of $B_1-B_1'$, $B_2-B_2'$, $B_3-B_3'$, and $B_4-B_4'$ only, and at the lines of $D_1-D_1'$, $D_2-D_2'$, $D_3-D_3'$, and $D_4-D_4'$ only, respectively.

The same description as made for the 1-2 upshift line $V = f_1(\theta)$ and the 1-2 downshift line $V = f_1'(\theta)$ is applied to the 2-3 upshift line designated as $V = f_2(\theta)$ in FIG. 8 and the 2-3 downshift line designated as $V = f_2'(\theta)$ in the same drawing.

For clarification, domains of the control and the electrical control circuit are defined below.

A three forward speed transmission controlled by the control of this invention comprises a torque converter, a planetary gear set, a transmission output shaft, and the control, wherein the control comprises an electrical control circuit, two hydraulic shift valves, two clutches, and two brakes, wherein the electrical control circuit comprises a throttle position signal generator, a vehicle speed signal generator, two solenoids, and two shift judge circuits comprising two comparison circuits and two feedback circuits.

It is claimed:

1. In an engine having throttle means, apparatus for generating a voltage corresponding to the position of said throttle means, comprising, in combination: magnetic means operatively associated with said throttle means; circuit means including a plurality of switch means and having an output terminal for supplying said voltage and changing the value thereof in a continuous stepped way when any one of said switch means is closed; said switch means being disposed in spaced relationship to each other and to said magnetic means; said switch means being closed by being energized by said magnetic means.

2. Apparatus according to claim 1, wherein said magnetic means comprises a rotatable member coupled to said throttle means, and a magnet coupled to said member for rotation therewith; said switch means being disposed radially about the axis of rotation of said rotatable member at predetermined angles with respect to each other; said magnet being rotatable by said throttle means through each of said predetermined angles in turn in each of first and second directions; and wherein each switch means disposed at each angle through which said magnet has been moved in said first direction by said throttle means remains energized until said magnet has been moved in said second direction through said each angle, said each switch means thereafter being de-energized in turn.

3. Apparatus as recited in claim 1, wherein each of said switch means has a predetermined angle assigned thereto, each of said switch means being disposed relative to said magnetic means so as to be energized when a throttle angle as measured from a fully closed position of said throttle means becomes said predetermined angle, said magnetic means being designed so as to energize all of said switch means whose said predetermined angles are smaller than said throttle angle.

4. Apparatus as recited in claim 3, wherein said circuit means further comprises: a plurality of impedance elements each of which is connected in series with each one of said switch means to make a set of series combinations of one of said switch means and one of said impedance elements; an additional impedance element; and a source of electrical energy; each of said series combinations being connected in parallel with other of said series combinations to make a parallel combination; one terminal of said parallel combination being connected to one terminal of said electrical energy source, a second terminal of said parallel combination being connected with one terminal of said additional impedance element, a second terminal of said additional impedance element being connected to a second terminal of said electrical energy source; said output terminal being connected with said parallel combination second terminal.

5. Apparatus as recited in claim 4, further comprising a further impedance element connected across said parallel combination.

6. Apparatus as recited in claim 4, wherein each of said switch means is de-energized when said throttle angle becomes an angle smaller than said predetermined angle assigned to each of said switch means.

7. Apparatus as recited in claim 5, wherein each of said switch means is de-energized when said throttle angle becomes an angle smaller than said predetermined angle assigned to each of said switch means.

8. Apparatus connected with a source of electrical energy for generating a voltage corresponding to throttle position of an engine having throttle means, comprising, in combination: magnetic means operatively associated with said throttle means; a plurality of switch means; a plurality of impedance elements each of which is connected in series with each one of said switch means to make a set of series combinations of one of said switch means and one of said impedance elements; an additional impedance element; and an output terminal for supplying said voltage; each of said series combinations being connected in parallel with other of said series combinations to make a parallel comination; one terminal of said parallel combination being connected to one terminal of said electrical energy source, a second terminal of said parallel combination being connected with one terminal of said additional impedance element, a second terminal of said additional impedance element being connected to a second terminal of said electrical energy source; said output terminal being connected with said parallel combination second terminal; each of said switch means having a predetermined angle assigned thereto, each of said switch means being disposed relative to said magnetic means so as to be energized when a throttle angle as measured from a fully closed position of said throttle means becomes said predetermined angle; said switch means being closed when said switch means is energized by said magnetic means; said magnetic means being designed so as to energize all of said switch means whose said predetermined angles are smaller than said throttle angle; each of said switch means being de-energized when said throttle angle becomes an angle smaller than said predetermined angle assigned to each of said switch means.

9. Apparatus as recited in claim 8, further comprising a further impedance element connected across said parallel combination.

* * * * *